(12) United States Patent
Dundigalla et al.

(10) Patent No.: US 11,437,037 B2
(45) Date of Patent: Sep. 6, 2022

(54) VIRTUAL ASSISTANT HOST PLATFORM CONFIGURED FOR INTERACTIVE VOICE RESPONSE SIMULATION

(71) Applicant: Bank of America Corporation, Charlotte, NC (US)

(72) Inventors: Srinivas Dundigalla, Charlotte, NC (US); Saurabh Mehta, Charlotte, NC (US); Pavan K. Chayanam, Alamo, CA (US)

(73) Assignee: Bank of America Corporation, Charlotte, NC (US)

( * ) Notice: Subject to any disclaimer, the term of this patent is extended or adjusted under 35 U.S.C. 154(b) by 227 days.

(21) Appl. No.: 16/933,097

(22) Filed: Jul. 20, 2020

(65) Prior Publication Data
US 2022/0020364 A1 Jan. 20, 2022

(51) Int. Cl.
| | |
|---|---|
| *G10L 15/22* | (2006.01) |
| *G06F 16/00* | (2019.01) |
| *G06F 9/451* | (2018.01) |
| *G06Q 20/10* | (2012.01) |
| *G10L 13/00* | (2006.01) |
| *G06F 3/16* | (2006.01) |
| *G10L 15/18* | (2013.01) |

(52) U.S. Cl.
CPC .............. *G10L 15/22* (2013.01); *G06F 3/167* (2013.01); *G06F 9/453* (2018.02); *G06Q 20/1085* (2013.01); *G10L 13/00* (2013.01); *G10L 15/1815* (2013.01); *G10L 2015/223* (2013.01)

(58) Field of Classification Search
CPC .................. G10L 15/22; G06F 16/00
See application file for complete search history.

(56) References Cited

U.S. PATENT DOCUMENTS

| | | |
|---|---|---|
| 5,675,637 A | 10/1997 | Szlam et al. |
| 6,362,838 B1 | 3/2002 | Szlam et al. |
| 6,925,607 B2 | 8/2005 | Szlam et al. |
| 7,283,829 B2 | 10/2007 | Christenson et al. |
| 7,668,718 B2 | 2/2010 | Kahn et al. |
| 7,814,221 B1 | 10/2010 | Fox |

(Continued)

FOREIGN PATENT DOCUMENTS

WO   WO-2020171809 A1 *  8/2020  ............. G06F 3/167

*Primary Examiner* — Shreyans A Patel
(74) *Attorney, Agent, or Firm* — Banner & Witcoff, Ltd.

(57) ABSTRACT

Aspects of the disclosure relate to using machine learning to simulate an interactive voice response system. A computing platform may receive user interaction information corresponding to interactions between a user and enterprise computing devices. Based on the user interaction information, the computing platform may identify predicted intents for the user, and may generate hotkey information based on the predicted intents. The computing platform may send the hotkey information and commands directing the mobile device to output the hotkey information. The computing platform may receive hotkey input information from the mobile device. Based on the hotkey input information, the computing platform may generate a hotkey response message. The computing platform may send, to the mobile device, the hotkey response message and commands directing the mobile device to convert the hotkey response message to an audio output and to output the audio output.

20 Claims, 12 Drawing Sheets

(56) References Cited

U.S. PATENT DOCUMENTS

| | | |
|---|---|---|
| 7,952,607 B2 | 5/2011 | Baker |
| 8,296,148 B1 | 10/2012 | Fox |
| 8,311,837 B1 | 11/2012 | Fox |
| 8,320,543 B2 | 11/2012 | Citron et al. |
| 8,335,723 B2 | 12/2012 | Tedesco et al. |
| 8,521,536 B1 | 8/2013 | Fox |
| 8,588,389 B2 | 11/2013 | Citron et al. |
| 8,595,085 B2 | 11/2013 | Tedesco et al. |
| 8,644,803 B1 | 2/2014 | Fox |
| 8,683,044 B2 | 3/2014 | Citron et al. |
| 8,838,455 B1 | 9/2014 | Fox |
| 8,862,760 B1 | 10/2014 | Fox |
| 9,002,937 B2 | 4/2015 | Levien et al. |
| 9,008,618 B1 | 4/2015 | Fox |
| 9,009,797 B1 | 4/2015 | Fox |
| 9,107,050 B1 | 8/2015 | Fox |
| 9,232,375 B1 | 1/2016 | Fox |
| 9,319,440 B2 | 4/2016 | Citron et al. |
| 9,473,627 B2 | 10/2016 | Thelin et al. |
| 9,503,550 B2 | 11/2016 | Levien et al. |
| 9,516,011 B1 | 12/2016 | Fox |
| 9,736,207 B1 | 8/2017 | Fox |
| 9,754,590 B1 | 9/2017 | Fox |
| 9,811,656 B1 | 11/2017 | Fox |
| 9,812,145 B1 | 11/2017 | Fox |
| 9,924,032 B1 | 3/2018 | Fox |
| 10,021,164 B1 | 7/2018 | Fox |
| 10,165,225 B2 | 12/2018 | Thelin et al. |
| 10,218,768 B1 | 2/2019 | Fox |
| 10,229,263 B1 | 3/2019 | Fox |
| 10,250,847 B2 | 4/2019 | Thelin et al. |
| 10,305,877 B1 | 5/2019 | Fox |
| 10,367,859 B2 | 7/2019 | O'Sullivan et al. |
| 10,375,128 B2 | 8/2019 | O'Sullivan et al. |
| 10,403,286 B1 | 9/2019 | Fox |
| 10,504,535 B1 | 12/2019 | Fox |
| 10,523,738 B1 | 12/2019 | Fox |
| 10,594,750 B2 | 3/2020 | O'Sullivan et al. |
| 10,594,751 B2 | 3/2020 | O'Sullivan et al. |
| 10,630,839 B1 | 4/2020 | Fox |
| 10,635,805 B1 | 4/2020 | Fox |
| 10,701,123 B1 | 6/2020 | Fox |
| 11,093,855 B1 * | 8/2021 | Fiedler .................. G06N 20/00 |
| 2019/0149959 A1 * | 5/2019 | Kee ...................... H04M 3/562 |
| | | 704/258 |
| 2019/0266280 A1 * | 8/2019 | Acampado ................ G06F 8/60 |
| 2021/0150385 A1 * | 5/2021 | Mallette .............. G06F 16/3329 |
| 2021/0233424 A1 * | 7/2021 | Lemme .................. G16H 10/20 |
| 2022/0019985 A1 * | 1/2022 | Dundigalla .......... G06Q 20/108 |
| 2022/0020364 A1 * | 1/2022 | Dundigalla ............. G10L 15/22 |

* cited by examiner

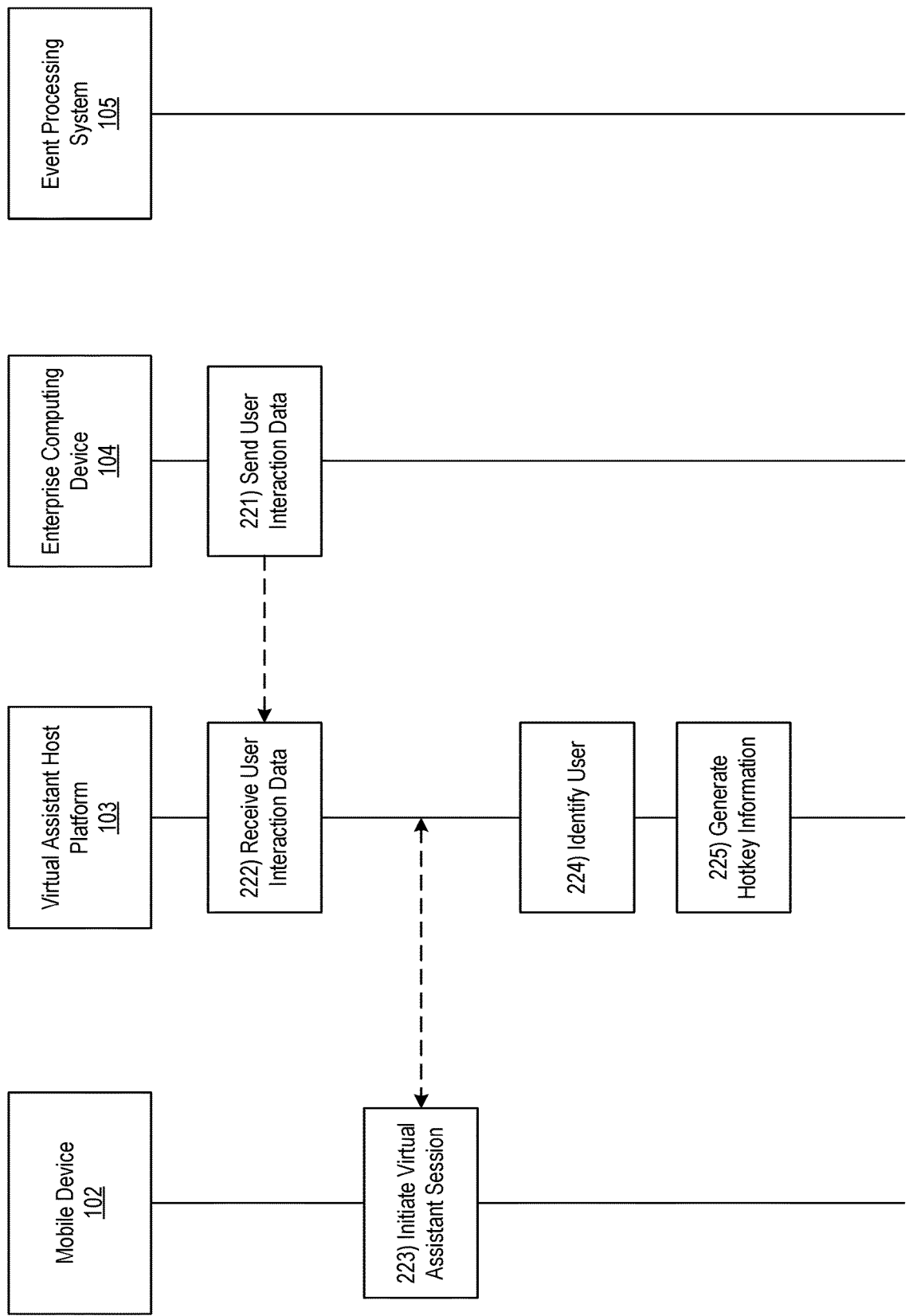

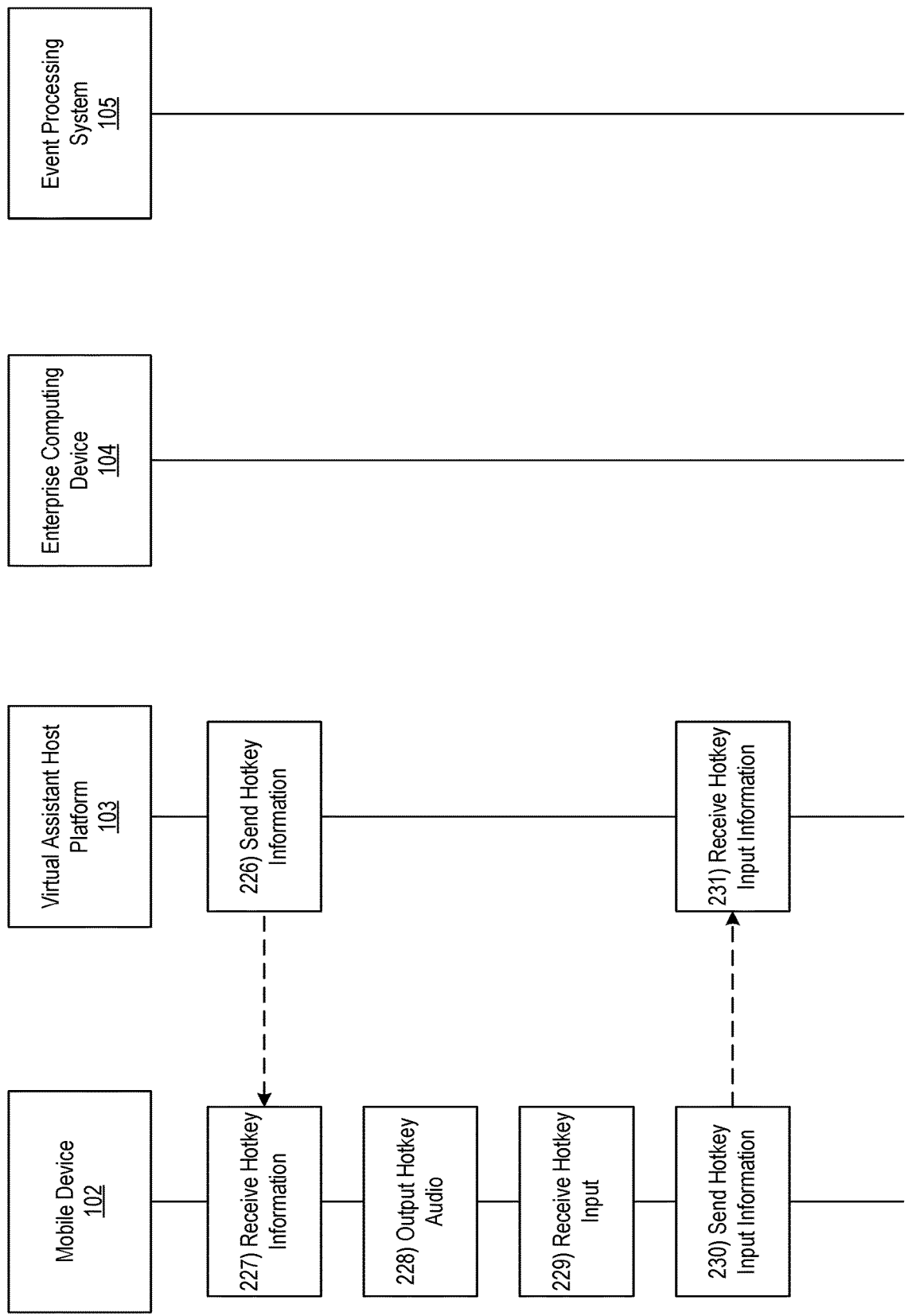

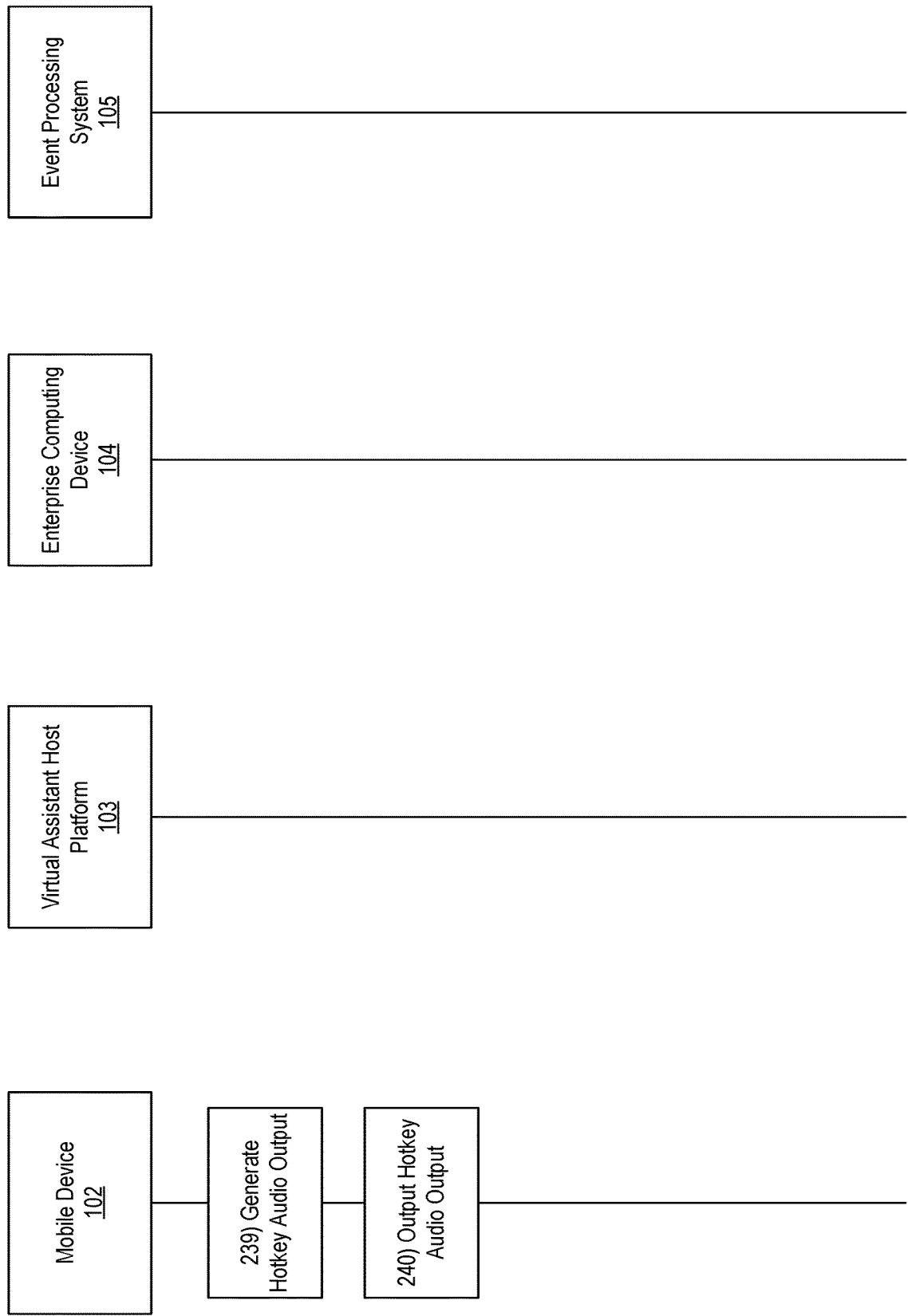

VIRTUAL ASSISTANT HOST PLATFORM CONFIGURED FOR INTERACTIVE VOICE RESPONSE SIMULATION

BACKGROUND

Aspects of the disclosure relate to interactive voice response (IVR) sessions. In particular, one or more aspects of the disclosure relate to computing platforms that implement machine learning algorithms and datasets to enable interactive voice response sessions.

In some cases, IVR systems may connect a customer request to a respective call center agent through a series of decisions. In some instances, however, this may consume considerable time for both customers and agents, and/or may result in processing delays. Furthermore, such processing of customer requests may overload certain computing resources while underutilizing others. Accordingly, it may be difficult for enterprise organizations to achieve the benefits of IVR systems while avoiding the corresponding delays and processing inefficiencies.

SUMMARY

Aspects of the disclosure provide effective, efficient, scalable, and convenient technical solutions that address and overcome the technical problems associated with interactive voice response (IVR) systems. For example, some aspects of the disclosure provide techniques that may enable computing devices to train a machine learning model using previously recorded phone and virtual IVR sessions, use the model to identify user intents, and provide automated responses accordingly. In doing so, various technical advantages may be realized. For example, one technical advantage is that enterprise computing and human resources may be conserved by routing client requests to an artificial intelligence engine rather than contact center resources, agents, or the like. Furthermore, another technical advantage is that processing load may be dynamically balanced by the artificial intelligence engine rather than exhausting certain resources and/or underutilizing others, which may lead to processing delays. Accordingly, these advantages may result in increased enterprise capabilities, such as providing automated voice responses to client questions, while reducing processing load on enterprise resources.

In accordance with one or more embodiments of the disclosure, a computing platform comprising at least one processor, a communication interface, and memory storing computer-readable instructions may establish a virtual assistant session with a mobile banking application executing on a mobile device, which may include authenticating at least one authentication credential associated with an online banking account. The computing platform may receive an assistance message from the mobile device requesting assistance. Using a machine learning model, the computing platform may identify an intent of the assistance message. The computing platform may generate a response message based on the intent of the assistance message. The computing platform may send the response message and one or more commands directing the mobile device to output an audio response file based on the response message to the mobile device, which may cause the mobile device to convert the response message into the audio response file and output the audio response file.

In one or more instances, the computing platform may authenticate the at least one authentication credential associated with the online banking account by authenticating one or more of: a user name, a password, biometric information, or a voice input. In one or more instances, prior to identifying the intent, the computing platform may train the machine learning model based on a plurality of recorded interactive voice response (IVR) sessions, where the plurality of recorded interactive voice response sessions include one or more of: phone sessions or virtual IVR sessions with one or more online banking customers.

In one or more instances, the computing platform may identify the intent by identifying one or more of: a balance inquiry request, a transaction status request, a request for information corresponding to a failed transaction, a credit score inquiry, credit card information, charge/payment information, a request for account information, a mortgage request, a request to execute a transaction, or a request for outage information. In one or more instances, the computing platform may generate the response message based on the intent of the assistance message by: 1) sending one or more commands directing an event processing system to process an event based on the intent of the assistance message, where sending the one or more commands directing the event processing system to process the event based on the intent of the assistance message causes the event processing system to process the event; 2) receiving, from the event processing system, an event processing notification indicating that the event was processed; and 3) generating, based on the event processing notification indicating that the event was processed, the assistance message.

In one or more instances, the computing platform may identify the intent of the assistance message based at least in part on information from the mobile device. In one or more instances, the virtual assistant session may correspond to a data channel between the mobile device and an artificial intelligence engine hosted by the computing platform.

In accordance with one or more additional or alternative embodiments of the disclosure, a computing platform comprising at least one processor, a communication interface, and memory storing computer-readable instructions may receive user interaction information corresponding to interactions between a user and one or more enterprise computing devices. The computing platform may establish a virtual assistant session with a mobile device. Based on the user interaction information corresponding to the interactions between the user and the one or more enterprise computing devices, the computing platform may identify one or more predicted intents for the user. The computing platform may generate hotkey information based on the one or more predicted intents for the user. The computing platform may send the hotkey information and one or more commands directing the mobile device to output the hotkey information to the mobile device, which may cause the mobile device to output the hotkey information. The computing platform may receive hotkey input information from the mobile device. Based on the hotkey input information, the computing platform may generate a hotkey response message. The computing platform may send, to the mobile device, the hotkey response message and one or more commands directing the mobile device to convert the hotkey response message to an audio output and to output the audio output, which may cause the mobile device to convert the hotkey response message to the audio output and to output the audio output.

In one or more instances, in sending the hotkey information and the one or more commands directing the mobile device to output the hotkey information to the mobile device, the computing platform may cause the mobile device to convert the hotkey information to a hotkey audio output and to output the hotkey audio output. In one or more instances, the hotkey audio output may indicate that one or more numeric values displayed on a display of the mobile device correspond to one or more of: a balance inquiry request, a transaction status request, a request for information corresponding to a failed transaction, a credit score inquiry, credit card information, charge/payment information, a request for account information, a mortgage request, a request to execute a transaction, or a request for outage information.

In one or more instances, the one or more enterprise computing devices may include one or more of: an automated teller machine (ATM) or a computing device at a branch location of a financial institution. In one or more instances, establishing the virtual assistant session with the mobile device may include establishing the virtual assistant session with a mobile banking application executing on the mobile device, and establishing the virtual assistant session with the mobile banking application executing on the mobile device may include authenticating at least one authentication credential associated with an online banking account.

In one or more instances, authenticating the at least one authentication credential associated with the online banking account may include authenticating one or more of: a user name, a password, biometric information, or a voice input. In one or more instances, the computing platform may receive second user interaction information corresponding to interactions between the user and the one or more enterprise computing devices. The computing platform may establish a second virtual assistant session with the mobile device. Based on the user interaction information corresponding to the interactions between the user and the one or more enterprise computing devices, the computing platform may identify one or more second predicted intents for the user. The computing platform may generate second hotkey information based on the one or more second predicted intents for the user, where the second hotkey information is different than the hotkey information.

In one or more instances, the computing platform may receive second user interaction information corresponding to interactions between a second user and one or more second enterprise computing devices. The computing platform may establish a second virtual assistant session with the mobile device. Based on the second user interaction information corresponding to the interactions between the second user and the one or more second enterprise computing devices, the computing platform may identify one or more predicted intents for the second user. The computing platform may generate second hotkey information based on the one or more predicted intents for the second user, where the second hotkey information is different than the hotkey information.

In one or more instances, the computing platform may identify the one or more predicted intents for the user by identifying, using a machine learning model, the one or more predicted intents for the user, where the machine learning model is trained, prior to identifying the one or more predicted intents, based on a plurality of recorded interactive voice response (IVR) sessions, where the plurality of recorded interactive voice response sessions correspond to one or more of: phone sessions or virtual IVR sessions with one or more online banking customers. In one or more instances, the computing platform may send one or more commands directing an event processing system to process an event based on the hotkey input information, which may cause the event processing system to process the event. The computing platform may receive, from the event processing system, an event processing notification indicating that the event was processed.

Based on the event processing notification indicating that the event was processed, the computing platform may generate the hotkey response message.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for implementing machine learning to enable IVR simulation in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe a virtual assistant system that may be developed and deployed to provide customers with access to a simulated interactive voice response (IVR) service. Specifically, a voice assistant for IVR with context based responses is described herein. The assistant may understand the context of a customer's call to the IVR, and may return a response to the customer accordingly. In some instances, the virtual assistant may directly speak to the customer with a voice response, understand user utterances, and/or allow the customer to continue a conversation with the virtual assistant. Additionally or alternatively, the virtual assistant may provide the ability for customers to use hot keys within an IVR dialer for contextual response, frequently asked questions, or the like, and may subsequently hand off these requests to a conversation window, live agent, or the like for other intents.

Many IVR systems operate by connecting customer requests to a respective contact center agent through a series of option flows, which may consume substantial time from the customer and substantial contact center resources. In many scenarios, the context of these customer requests are simple (e.g., relating account information, credit card statement, last failed transaction, or the like). Accordingly, if the IVR can be made intelligent with voice based virtual assistant functionality with a dialer directly on a mobile application, contact center resources may be conserved and customer experience may be improved. In short, rather than being serviced by a live agent, the customer may be serviced by an artificial intelligence (AI)-enabled assistant.

Figure 1A:
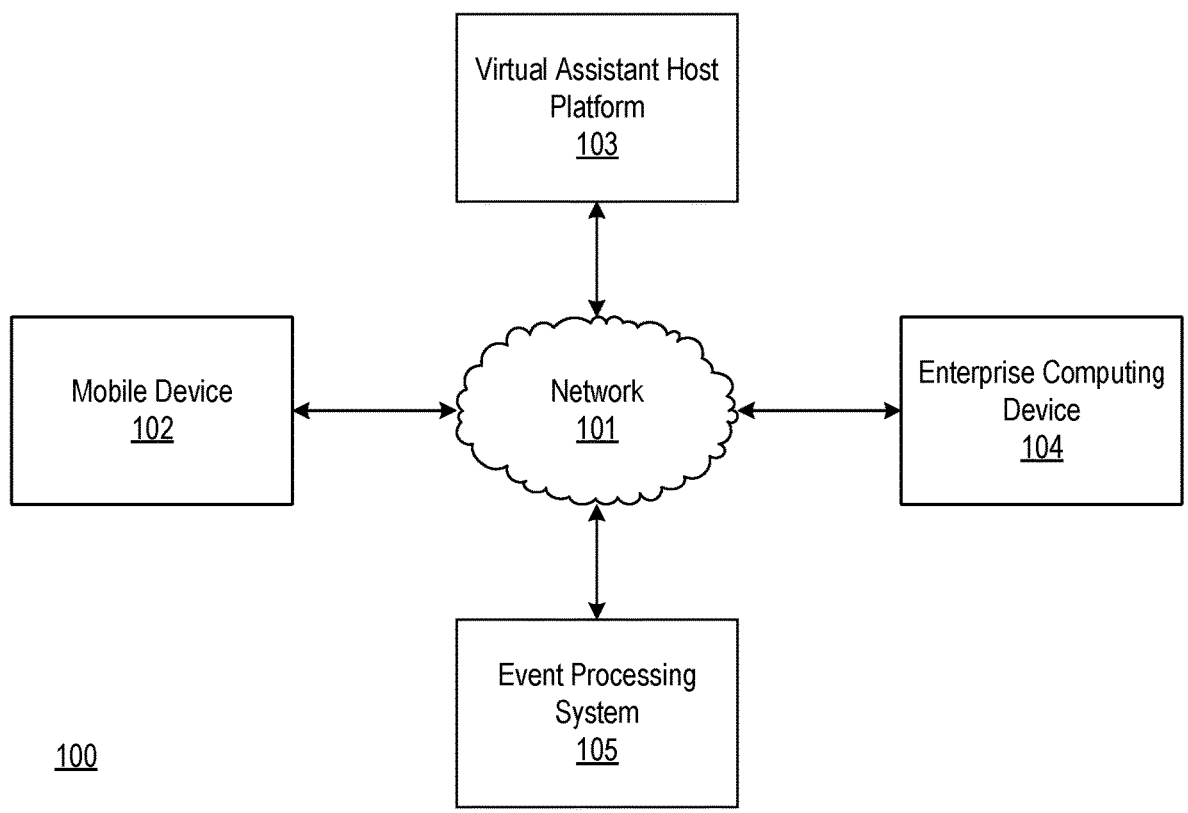
FIGS. 1A-1B depict an illustrative computing environment for implementing machine learning to enable IVR simulation in accordance with one or more example embodiments.
Figure 1B:
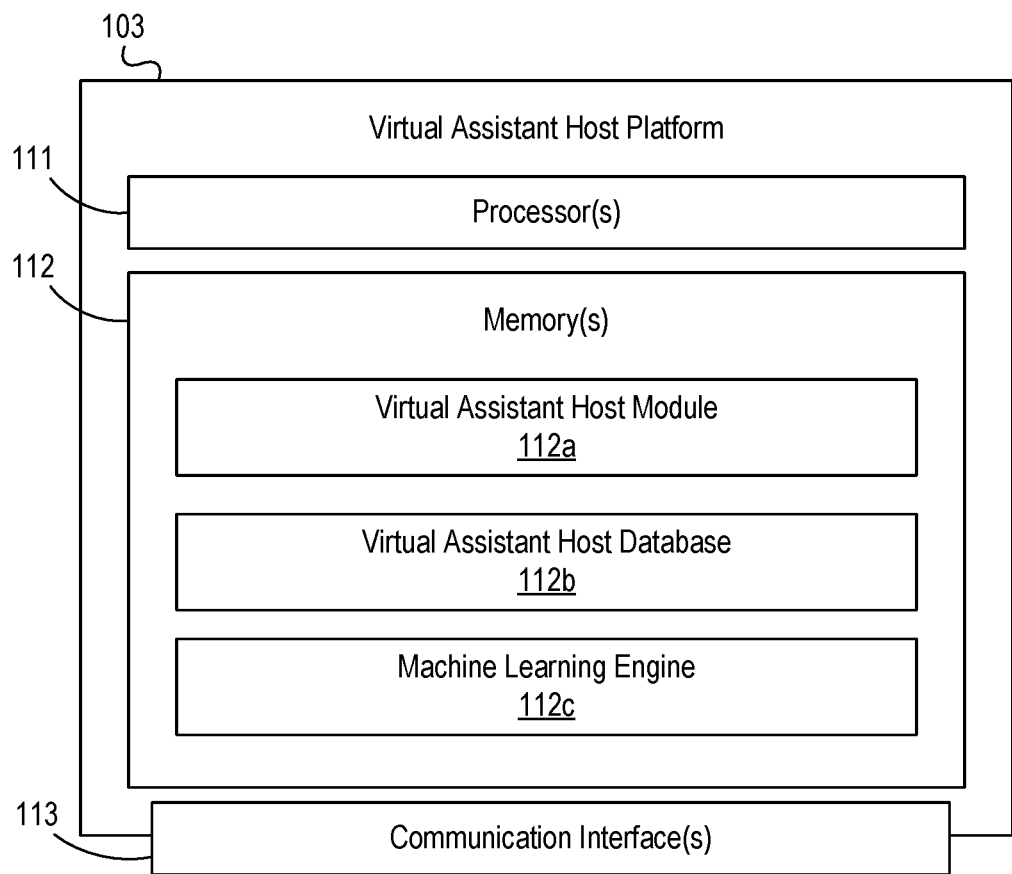

FIGS. 1A-1B depict an illustrative computing environment that implements machine learning to enable IVR simulation in accordance with one or more example embodiments. Referring to FIG. 1A, computing environment 100 may include one or more computer systems. For example, computing environment 100 may include a mobile device 102, virtual assistant host platform 103, enterprise computing device 104, and event processing system 105.

Mobile device 102 may be a mobile device, tablet, smartphone, or the like that may be used by an individual such as a customer of an enterprise organization (e.g., a financial institution). For example, the mobile device 102 may be used to interact with an account for an enterprise organization (e.g., an online banking account, or the like). In some instances, the mobile device 102 may be configured to communicate with a virtual assistant host platform (e.g., virtual assistant host platform 103, or the like) to provide one or more virtual assistant services to the individual. In some instances, mobile device 102 may be configured to display one or more user interfaces (e.g., online banking interfaces, or the like) and/or provide one or more audio outputs.

As described further below, virtual assistant host platform 103 may be a computer system that includes one or more computing devices (e.g., servers, server blades, or the like) and/or other computer components (e.g., processors, memories, communication interfaces) that may be used to host and maintain an IVR simulation model. In some instances, the virtual assistant host platform 103 may be configured to train the IVR simulation model using previously recorded phone calls and/or IVR sessions, use the IVR simulation model to identify an intent of an individual, and to provide automated responses to the individual and/or cause one or more events to be processed based on the intent. In some instances, the virtual assistant host platform 103 may be configured to dynamically update the IVR simulation model as additional data and/or feedback is received.

Enterprise computing device 104 may be one or more computing devices such as automated teller machines (ATM), teller computing devices, or the like. For example, the enterprise computing device 104 may be used to receive user interaction inputs, which may, in some instances, cause the enterprise computing device 104 to perform one or more tasks based on the user interaction input (e.g., deposit, withdrawal, check balance, or the like). In some instances, the enterprise computing device 104 may be configured to communicate with the virtual assistant host platform 103 to provide user interaction information.

Event processing system 105 may be a server, server blade, or the like configured to perform one or more enterprise activities (e.g., online banking activities, financial transactions, trades, or the like). In some instances, the event processing system 105 may correspond to one or more backend resources corresponding to an enterprise organization. For example, event processing system 105 may be maintained by an enterprise organization, such as a financial institution.

Computing environment 100 also may include one or more networks, which may interconnect mobile device 102, virtual assistant host platform 103, enterprise computing device 104, event processing system 105, or the like. For example, computing environment 100 may include a network 101 (which may interconnect, e.g., mobile device 102, virtual assistant host platform 103, enterprise computing device 104, event processing system 105, or the like).

In one or more arrangements, mobile device 102, virtual assistant host platform 103, enterprise computing device 104, and/or event processing system 105 may be any type of computing device capable of sending and/or receiving requests and processing the requests accordingly. For example, mobile device 102, virtual assistant host platform 103, enterprise computing device 104, event processing system 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of mobile device 102, virtual assistant host platform 103, enterprise computing device 104, and/or event processing system 105, may, in some instances, be special-purpose computing devices configured to perform specific functions.

Referring to FIG. 1B, virtual assistant host platform 103 may include one or more processors 111, memory 112, and communication interface 113. A data bus may interconnect processor 111, memory 112, and communication interface 113. Communication interface 113 may be a network interface configured to support communication between virtual assistant host platform 103 and one or more networks (e.g., network 101, or the like). Memory 112 may include one or more program modules having instructions that when executed by processor 111 cause virtual assistant host platform 103 to perform one or more functions described herein and/or one or more databases that may store and/or otherwise maintain information which may be used by such program modules and/or processor 111. In some instances, the one or more program modules and/or databases may be stored by and/or maintained in different memory units of virtual assistant host platform 103 and/or by different computing devices that may form and/or otherwise make up virtual assistant host platform 103. For example, memory 112 may have, host, store, and/or include virtual assistant host module 112a, virtual assistant host database 112b, and a machine learning engine 112c.

Virtual assistant host module 112a may have instructions that direct and/or cause virtual assistant host platform 103 to execute advanced machine learning techniques to provide one or more virtual assist services, such as simulated IVR, as discussed in greater detail below. Virtual assistant host database 112b may store information used by virtual assistant host module 112a and/or virtual assistant host platform 103 in application of advanced machine learning techniques to provide one or more virtual assist services, and/or in performing other functions. Machine learning engine 112c may have instructions that direct and/or cause the virtual assistant host platform 103 to set, define, and/or iteratively refine optimization rules and/or other parameters used by the virtual assistant host platform 103 and/or other systems in computing environment 100.

Figure 2A:
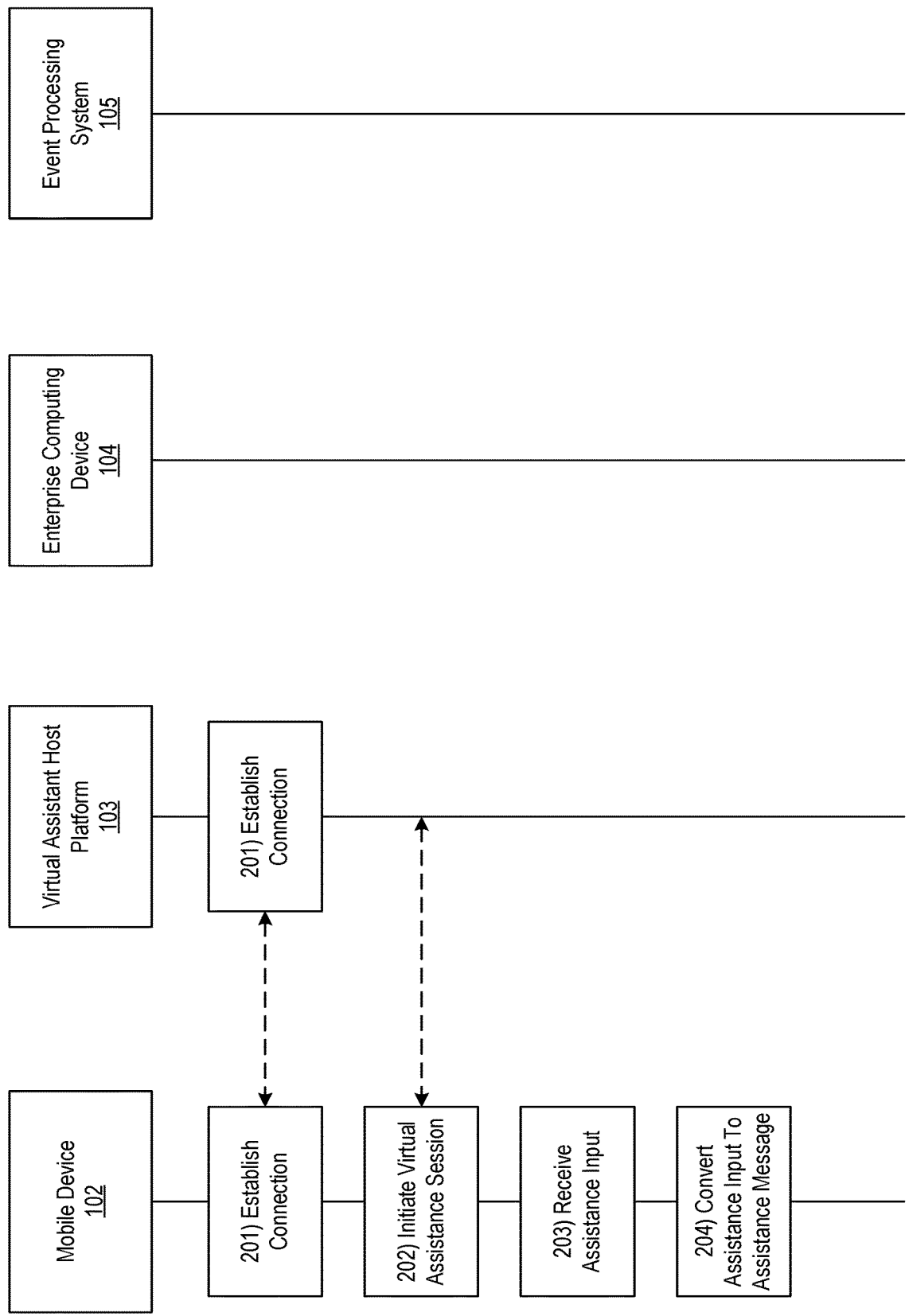

FIGS. 2A-2H depict an illustrative event sequence that implements machine learning to enable IVR simulation in accordance with one or more example embodiments. Referring to FIG. 2A, at step 201, the mobile device 102 may establish a connection with the virtual assistant host platform 103. For example, the mobile device 102 may establish a first wireless data connection with the virtual assistant host platform 103 to link the mobile device 102 to the virtual assistant host platform 103 (e.g., in preparation for initiating a virtual assistance session). In some instances, the mobile device 102 may identify whether or not a connection is already established with the virtual assistant host platform

103. If a connection is already established with the virtual assistant host platform 103, the mobile device 102 might not re-establish the connection. If a connection is not yet established with the virtual assistant host platform 103, the mobile device 102 may establish the first wireless data connection as described herein.

At step 202, the mobile device 102 may initiate a virtual assistance session with the virtual assistant host platform 103. For example, the mobile device 102 may establish a virtual assistance session between an application running on the mobile device 102 (e.g., a mobile banking application, or the like) and the virtual assistant host platform 103 (e.g., an artificial intelligence engine running at the virtual assistant host platform 103). In some instances, in establishing the virtual assistance session, the mobile device 102 may establish a session with the virtual assistant host platform 103 that enables a user of the mobile device 102 to provide a voice input, and receive an audio output in response (which may e.g., be generated using a machine learning model hosted by the virtual assistant host platform 103). In some instances, in initiating the virtual assistance session, the mobile device 102 and/or the virtual assistant host platform 103 may authenticate the mobile device 102 and/or the user of the mobile device 102 (e.g., based on a user name, a password, biometric information, a voice input, or the like, which may, in some instances, be associated with an online banking account).

At step 203, the mobile device 102 may receive an assistance input. For example, the mobile device 102 may receive a voice input from the user of the mobile device 102 requesting a response to an inquiry, an event to be processed, or the like.

In some instances, the mobile device 102 may receive a user input indicating a particular inquiry to be made, event to be processed, or the like. In other instances, the mobile device 102 may receive a user input requesting to speak with a live representative. In these instances, the mobile device 102 may contact a call center and cause a voice call session to be established between the mobile device 102 and a computing device operated by an employee of the enterprise organization (e.g., a customer service representative at a call center for a financial institution). In operating in this manner, the mobile device 102 and the virtual assistant host platform 103 may reduce load on representatives and/or computing resources at the call center by automatically handling a large percentage of requests through the automated IVR process, as described further below. Similarly, this may reduce customer delays (e.g., the user does not need to wait for a live representative, or, if he or she does need a live representative, due to the reduced load, wait times may be reduced or eliminated).

At step 204, the mobile device 102 may convert the assistance input received at step 203 into an assistance message (e.g., convert from audio to text). For example, the mobile device 102 may apply one or more natural language processing techniques to convert the assistance input from an audio file into a text file, which may, e.g., be sent as a message to the virtual assistant host platform 103 for processing.

Figure 2B:
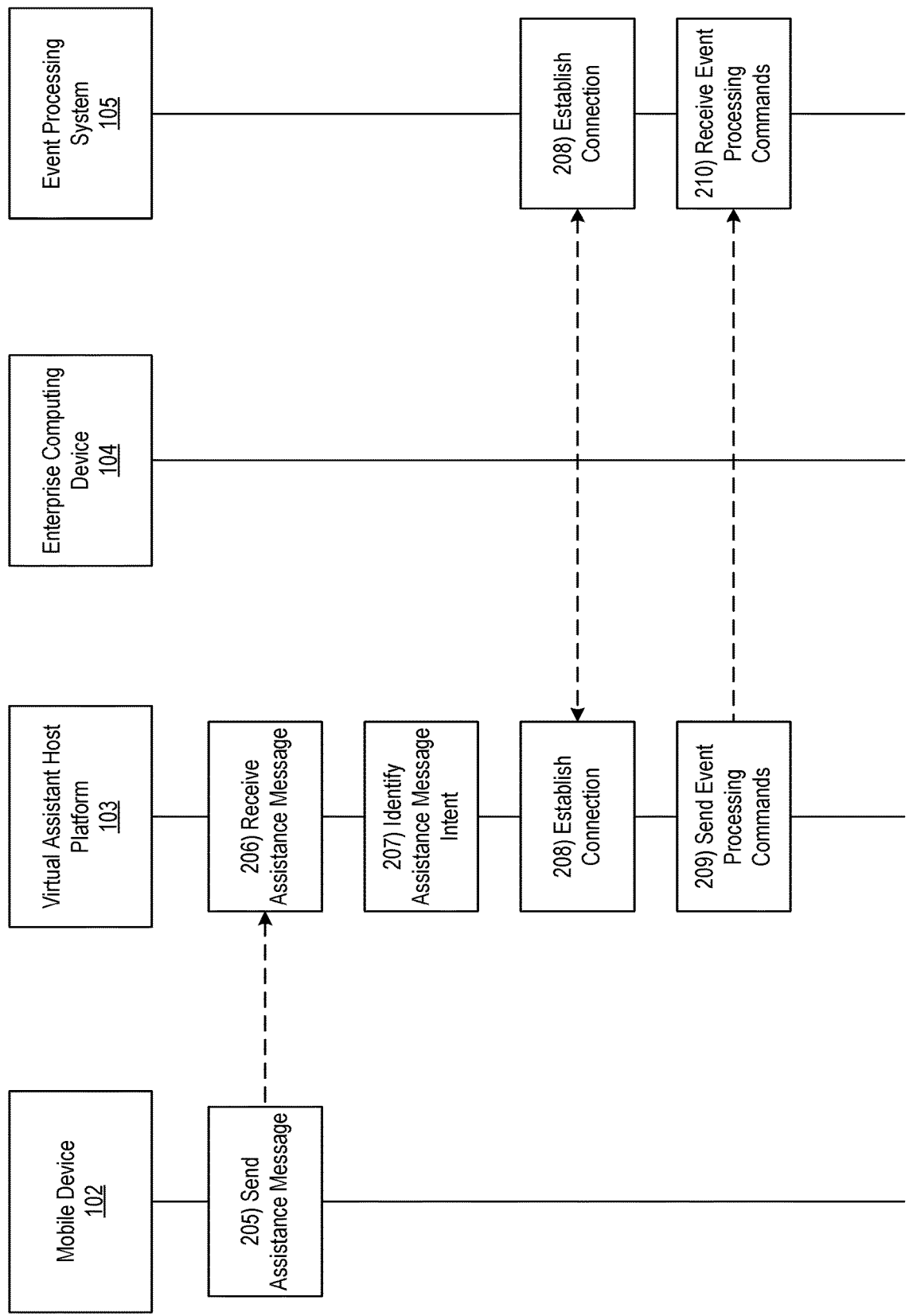

Referring to FIG. 2B, at step 205, the mobile device 102 may send the assistance message to the virtual assistant host platform 103. For example, the mobile device 102 may send the assistance message to the virtual assistant host platform 103 while the first wireless data connection is established.

At step 206, the virtual assistant host platform 103 may receive the assistance message sent at step 205. For example, the virtual assistant host platform 103 may receive the assistance message via the communication interface 113 and while the first wireless data connection is established.

At step 207, the virtual assistant host platform 103 may identify an intent from the assistance message. For example, the virtual assistant host platform 103 may input the assistance message into an IVR simulation model hosted by the virtual assistant host platform 103. For example, the virtual assistant host platform 103 may train the IVR simulation model based on previously recorded audio files corresponding to phone call and/or virtual IVR sessions with one or more individuals (e.g., online banking customers, or the like). In doing so, the virtual assistant host platform 103 may label data corresponding to these previous phone and/or virtual IVR sessions with an identified intent. Then, to identify the intent from the assistance message, the virtual assistant host platform 103 may identify data stored in the IVR simulation model that corresponds to the assistance message, and may identify an intent corresponding to the identified data. For example, in identifying the intent from the assistance message, the virtual assistant host platform 103 may identify one or more of: a balance inquiry request, a transaction status request, a request for information corresponding to a failed transaction, a credit score inquiry, credit card information, charge/payment information, a request for account information, a mortgage request, a request to execute a transaction, a request for outage information, a request to process a transaction, a request to initiate a fund transfer, or the like.

In some instances, the virtual assistant host platform 103 may identify whether or not it has locally stored information that may be used to satisfy the intent or is otherwise configured to satisfy the intent without assistance from the event processing system 105. If the virtual assistant host platform 103 is configured to satisfy the intent using local resources, the virtual assistant host platform 103 may proceed to step 214. If the virtual assistant host platform 103 is not configured to satisfy the intent using local resources, the virtual assistant host platform 103 may proceed to step 208.

At step 208, the virtual assistant host platform 103 may establish a connection with event processing system 105. For example, the virtual assistant host platform 103 may establish a second wireless data connection with the event processing system 105 to link the virtual assistant host platform 103 to the event processing system 105 (e.g., in preparation for sending one or more commands directing the event processing system 105 to process an event, provide information, the like based on the identified assistance message intent). In some instances, the virtual assistant host platform 103 may identify whether or not a connection is already established with the event processing system 105. If a connection is already established with the event processing system 105, the virtual assistant host platform 103 might not re-establish the connection. If a connection is not yet established with the event processing system 105, the virtual assistant host platform 103 may establish the second wireless data connection as described herein.

At step 209, the virtual assistant host platform 103 may send one or more event processing commands to the event processing system 105. For example, the virtual assistant host platform 103 may send the one or more event processing commands to the event processing system 105 via the communication interface 113 and while the second wireless data connection is established.

At step 210, the event processing system 105 may receive the one or more event processing commands sent at step 209. For example, the event processing system 105 may receive the one or more event processing commands while the second wireless data connection is established.

Figure 2C:
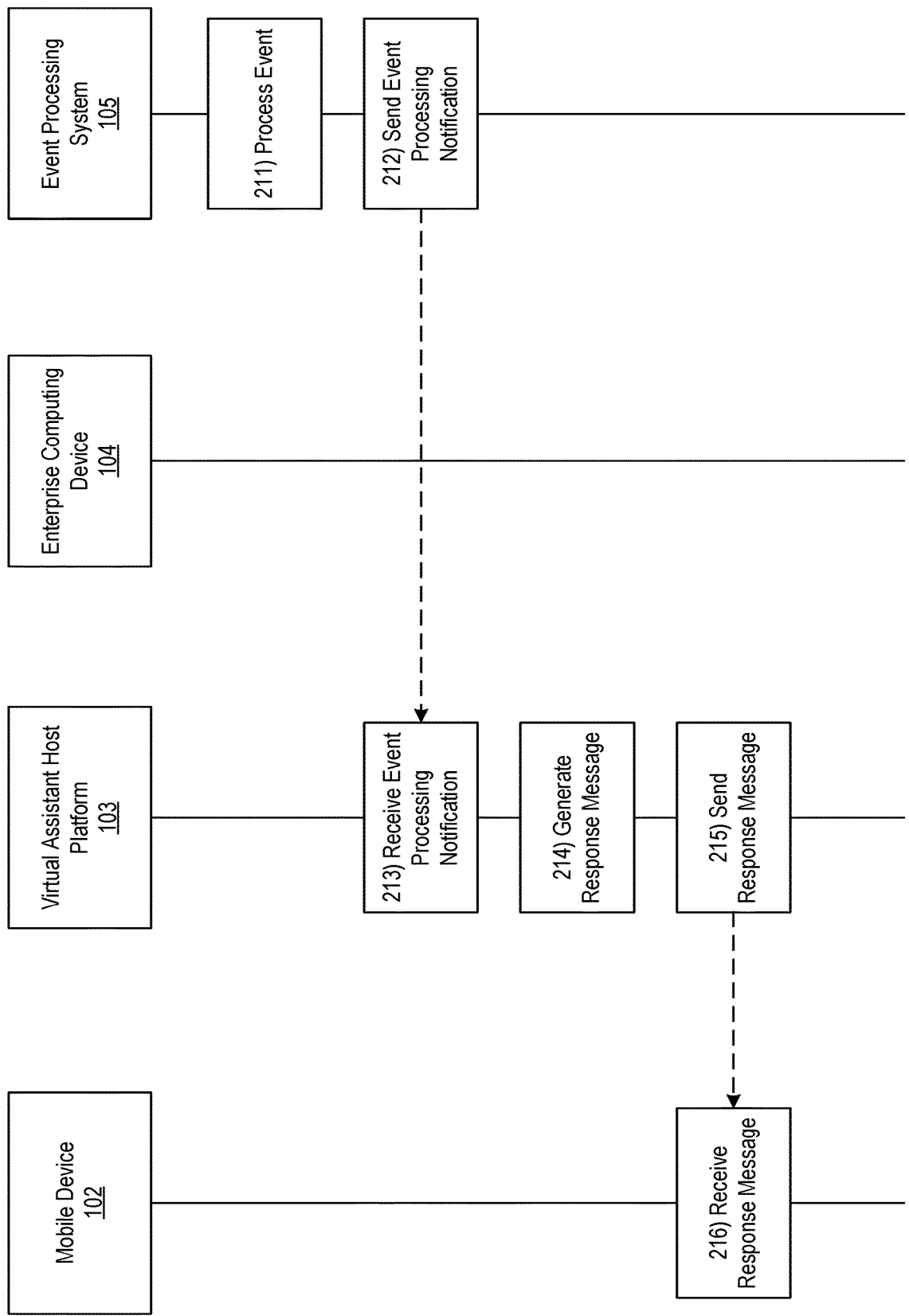

Referring to FIG. 2C, at step 211, the event processing system 105 may process an event, provide a response to an inquiry, or the like based on or in response to the one or more event processing commands received at step 210. For example, the event processing system 105 may identify an account balance, a transaction status, failed transaction information, credit score information, credit card information, charge/payment information, account information, mortgage information, outage information, or the like. Additionally or alternatively, the event processing system 105 may process or otherwise execute a transaction, fund transfer, or the like.

At step 212, the event processing system 105 may generate and send an event processing notification based on the event and/or inquiry processed at step 211. For example, the event processing system 105 may generate a notification indicating an account balance, a transaction status, failed transaction information, credit score information, credit card information, charge/payment information, account information, mortgage information, outage information, or the like. Additionally or alternatively, the event processing system 105 may generate a notification indicating that a transaction, fund transfer, or the like was executed. In some instances, the event processing system 105 may send the event processing notification to the virtual assistant host platform 103 while the second wireless data connection is established.

At step 213, the virtual assistant host platform 103 may receive the event processing notification sent at step 212. For example, the virtual assistant host platform 103 may receive the event processing notification via the communication interface 113 and while the second wireless data connection is established.

At step 214, the virtual assistant host platform 103 may generate a response message based on the event processing notification received at step 213. For example, the virtual assistant host platform 103 may generate the response message based on the information included in the event processing notification. In some instances, in addition to the response message, the virtual assistant host platform 103 may generate one or more commands directing the mobile device 102 to convert the response message from text to audio, and to output the converted audio response message.

At step 215, the virtual assistant host platform 103 may send the response message and/or the one or more commands directing the mobile device 102 to convert the response message from text to audio, and to output the converted audio response message to the mobile device 102. For example, the virtual assistant host platform 103 may send the response message and/or the one or more commands directing the mobile device 102 to convert the response message from text to audio, and to output the converted audio response message via the communication interface 113 and while the first wireless data connection is established.

At step 216, the mobile device 102 may receive the response message and/or the one or more commands directing the mobile device 102 to convert the response message from text to audio, and to output the converted audio response message to the mobile device 102 sent at step 215. For example, the mobile device 102 may receive the response message and/or the one or more commands directing the mobile device 102 to convert the response message from text to audio, and to output the converted audio response message via the communication interface 113 and while the first wireless data connection is established.

Figure 2D:
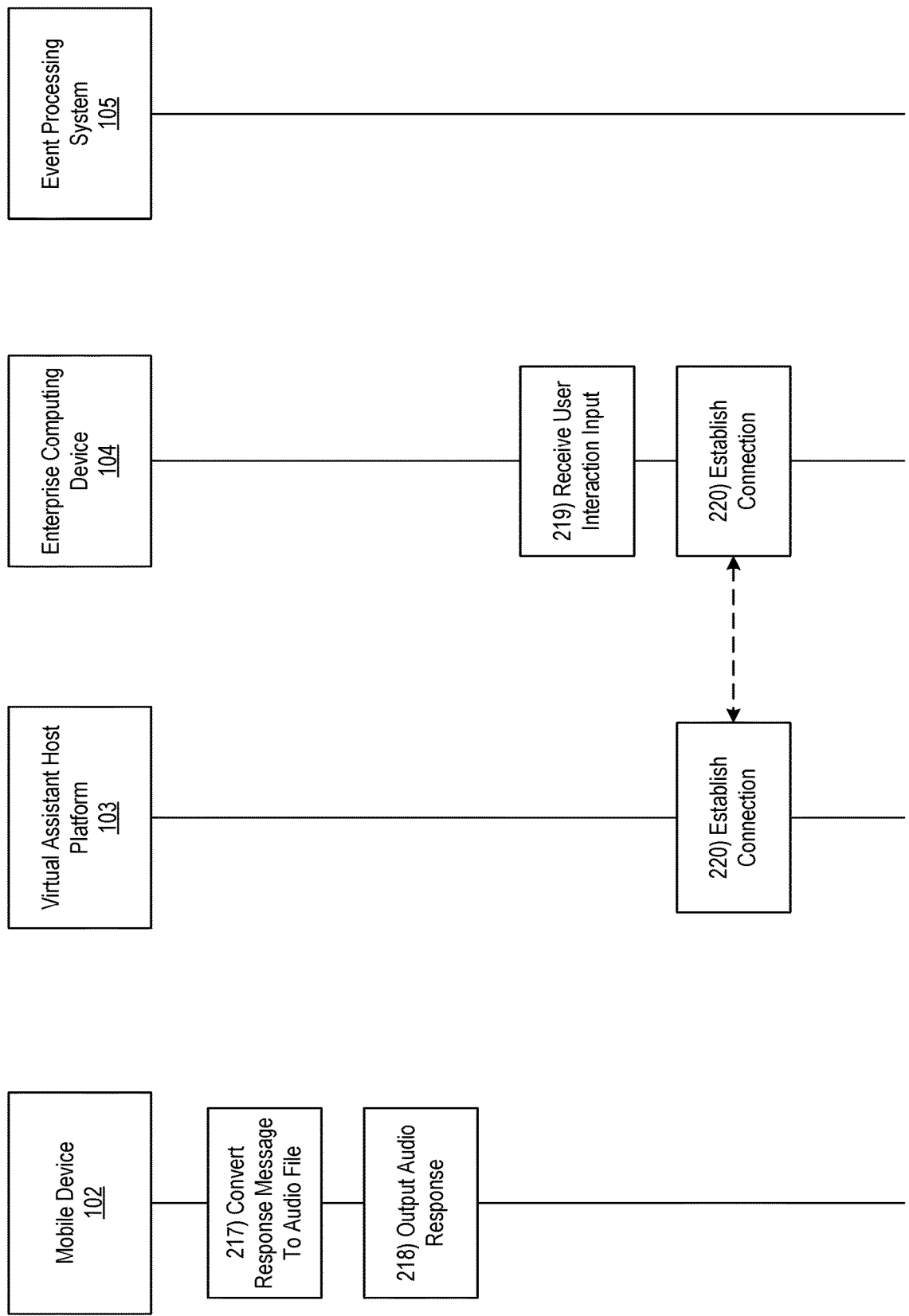

Referring to FIG. 2D, at step 217, the mobile device 102 may convert the response message to an audio response output. For example, the mobile device 102 may use one or more text to speech techniques to convert the response message (e.g., which may be in text form) to an audio response output. In some instances, the mobile device 102 may convert the response message to an audio response output based on or in response to the one or more commands directing the mobile device 102 to convert the response message from text to audio, and to output the converted audio response message.

At step 218, the mobile device 102 may output the audio response output generated at step 217. For example, the mobile device 102 may output the audio response output based on or in response to the one or more commands directing the mobile device 102 to convert the response message from text to audio, and to output the converted audio response message. For example, the mobile device 102 may cause an audio output of an account balance, a transaction status, failed transaction information, credit score information, credit card information, charge/payment information, account information, mortgage information, outage information, a transaction status, or the like as a response to the assistance message sent at step 205. In some instances, the mobile device 102 may receive feedback corresponding to the audio response output (e.g., did it satisfy the user intent, or the like), and may send the feedback to the virtual assistant host platform 103, which may update the IVR simulation model accordingly.

Steps 219-248, as described below, describe an additional or alternative embodiment to that described above with regard to steps 201-218. In some instances, steps 201-218 and/or steps 219-248 may be performed independently of each other. In other instances, steps 201-218 and steps 219-248 may both be performed (e.g., simultaneously, sequentially, or the like).

At step 219, enterprise computing device 104 may receive a user interaction input. For example, the enterprise computing device 104 may receive a user interaction input corresponding to an ATM transaction, branch transaction, online transaction, or the like performed by the user of the mobile device 102.

At step 220, the enterprise computing device 104 may establish a connection with the virtual assistant host platform 103. For example, the enterprise computing device 104 may establish a third wireless data connection with the virtual assistant host platform 103 to link the enterprise computing device 104 to the virtual assistant host platform 103 (e.g., in preparation for sending user interaction information). In some instances, the enterprise computing device 104 may identify whether or not a connection is already established with the virtual assistant host platform 103. If a connection is already established with the virtual assistant host platform 103, the enterprise computing device 104 might not re-establish the connection. If a connection is not yet established with the virtual assistant host platform 103, the enterprise computing device 104 may establish the third wireless data connection as described herein.

Referring to FIG. 2E, at step 221, the enterprise computing device 104 may send user interaction data to the virtual assistant host platform 103. For example, the enterprise computing device 104 may send data corresponding to the user interaction input received at step 219. In some instances, the enterprise computing device 104 may send the user interaction data to the virtual assistant host platform 103 while the third wireless data connection is established.

At step 222, the virtual assistant host platform 103 may receive the user interaction data sent at step 221. For example, the virtual assistant host platform 103 may receive the user interaction data via the communication interface 113 and while the third wireless data connection is established. In some instances, the virtual assistant host platform 103 may store the user interaction data in the IVR simulation model along with one or more user identifiers that may be used to identify user interaction data corresponding to the user.

In some instances, the user may interact with a plurality of enterprise computing devices similar to enterprise computing device 104, and steps 219-222 may be repeated for each enterprise computing device (e.g., to establish a machine learning database corresponding to recent activities performed by the user at enterprise computing devices). Additionally or alternatively, steps 219-222 may be repeated for interactions between various other customers and a plurality of enterprise computing devices (e.g., to establish a machine learning database of frequent interactions, general outages, or the like that may apply to a plurality of customers that includes the user of the mobile device 102).

At step 223, the mobile device 102 may initiate a virtual assistance session with the virtual assistant host platform 103. For example, the mobile device 102 may establish a virtual assistance session between an application running on the mobile device 102 (e.g., a mobile banking application, or the like) and the virtual assistant host platform 103. In some instances, in establishing the virtual assistance session, the mobile device 102 may establish a session with the virtual assistant host platform 103 that enables a user of the mobile device 102 to provide a voice input, and receive an audio output in response (which may e.g., be generated using a machine learning model hosted by the virtual assistant host platform 103). In some instances, in initiating the virtual assistance session, the mobile device 102 and/or the virtual assistant host platform 103 may authenticate the mobile device 102 and/or the user of the mobile device 102 (e.g., based on a user name, a password, biometric information, a voice input, or the like, which may, in some instances, be associated with an online banking account). In some instances, actions performed at step 223 may be similar to those described above with regard to step 202.

At step 224, the virtual assistant host platform 103 may identify the user of the mobile device 102. For example, the virtual assistant host platform 103 may identify the user based on authentication information, a device identifier, or the like sent at step 223 to initiate the virtual assistant session. Additionally or alternatively, the virtual assistant host platform 103 may apply one or more voice recognition techniques to identify the user based on his or her voice.

At step 225, the virtual assistant host platform 103 may generate hotkey information for the identified user. For example, the virtual assistant host platform 103 may use the IVR simulation model to access the user interaction data received at step 222 to identify recent activity that the user engaged in (e.g., the user may be requesting assistance with a recent activity) and/or that has been identified as a frequently conducted activity (e.g., check account balance, or the like) based on aggregated user interaction data for a plurality of customers. Additionally or alternatively, the virtual assistant host platform 103 may use the IVR simulation model to access frequently asked questions, or the like that may be aggregated based on virtual assistant sessions between the virtual assistant host platform 103 and a plurality of mobile devices 102 each corresponding to a different customer. Using the IVR simulation as described above, the virtual assistant host platform 103 may predict requests that the user may be likely to make, and may generate hotkey information corresponding to these predicted requests. For example, the virtual assistant host platform 103 may identify that the user recently attempted to cash a check at the enterprise computing device 104, but the transaction failed. In this example, the virtual assistant host platform 103 may determine that the user is likely planning to request an explanation or assistance corresponding to the failed transaction, and accordingly, the virtual assistant host platform 103 may generate hotkey information indicating "Please select 1 for assistance with your failed check deposit on Jun. 23, 2020." Similarly, the virtual assistant host platform 103 may generate hotkey information indicating a number to select on the mobile device 102 to request information, process an event, or the like (e.g., the virtual assistant host platform 103 may link one request or event to each number displayed on the mobile device 102 (e.g., 0-9)). For example, the virtual assistant host platform 103 may generate hotkey information indicating a number to select on the mobile device 102 to identify an account balance, a transaction status, failed transaction information, credit score information, credit card information, charge/payment information, account information, mortgage information, outage information, or the like. Additionally or alternatively, the virtual assistant host platform 103 may generate hotkey information indicating a number to select on the mobile device 102 to process or otherwise execute a transaction, fund transfer, or the like. For example, the virtual assistant host platform 103 may generate hotkey information that may be used to indicate "Please select [0-9] to perform [task, request, process event, or the like]."

In one or more instances, in the virtual assistant host platform 103 may generate different hotkey information for the user during each virtual assistant session (e.g., based on updated and/or newly received user interaction information). For example, the virtual assistant host platform 103 may generate first hotkey information for the user during a first virtual assistant session based on a first predicted user intent identified from first user interaction information, and may (e.g., several days, weeks, months, or the like) later generate second hotkey information for the user during a second virtual assistant session based on a second predicted user intent identified from second user interaction information. Similarly, the virtual assistant host platform 103 may generate different hotkey information for different customers (e.g., based on user interaction information corresponding to each customer). For example, the virtual assistant host platform 103 may generate first hotkey information for a first user during a first virtual assistant session based on a predicted user intent for the first user identified from user interaction information corresponding to the first user, and may generate second hotkey information for a second user during a second virtual assistant session based on a predicted user intent for the second user identified from user interaction information corresponding to the second user. In doing so, the virtual assistant host platform 103 may generate dynamic and customized hotkey information specific to individual customers at a given time. Additionally, the virtual assistant host platform 103 may generate one or more commands directing the mobile device 102 to convert the hotkey information to a hotkey audio output, and to output the hotkey audio output.

Referring to FIG. 2F, at step 226, the virtual assistant host platform 103 may send the hotkey information and/or one or more commands directing the mobile device 102 to convert the hotkey information to the hotkey audio output, and to output the hotkey audio output to the mobile device 102. For example, the virtual assistant host platform 103 may send the hotkey information and/or one or more commands directing the mobile device 102 to convert the hotkey information to the hotkey audio output, and to output the hotkey audio output via the communication interface 113 and while the first wireless data connection is established.

At step 227, the mobile device 102 may receive the hotkey information and/or one or more commands directing the mobile device 102 to convert the hotkey information to the hotkey audio output, and to output the hotkey audio output. For example, the mobile device 102 may receive the hotkey information and/or one or more commands directing the mobile device 102 to convert the hotkey information to the hotkey audio output, and to output the hotkey audio output while the first wireless data connection is established.

At step 228, the mobile device 102 may generate an audio hotkey output, and may output the audio hotkey output. For example, the mobile device 102 may generate and output the audio hotkey output based on or in response to the hotkey information and/or the one or more commands directing the mobile device 102 to convert the hotkey information to the hotkey audio output, and to output the hotkey audio output. For example, the mobile device 102 may output "Please select 1 for your account balance, please select 2 for more information about your failed check deposit on Jun. 23, 2020 . . ." or the like.

At step 229, the mobile device 102 may receive a hotkey input. For example, the mobile device 102 may receive a user input corresponding to a selection of one of the numbers displayed on the mobile device 102. In some instances, the mobile device 102 may receive a user input selecting a particular inquiry to be made, event to be processed, or the like. In other instances, the mobile device 102 may receive a user input indicating that the hotkey audio output does not correspond to the actual intent of the user, and requesting to speak with a live representative. In these instances, the mobile device 102 may contact a call center and cause a voice call session to be established between the mobile device 102 and a computing device operated by an employee of the enterprise organization (e.g., a customer service representative at a call center for a financial institution). In operating in this manner, the mobile device 102 and the virtual assistant host platform 103 may reduce load on representatives and/or computing resources at the call center by automatically handling a large percentage of requests through the hotkey selection process. Similarly, this may reduce customer delays (e.g., the user does not need to wait for a live representative, or, if he or she does need a live representative, due to the reduced load, wait times may be reduced or eliminated).

At step 230, the mobile device 102 may send hotkey input information (e.g., based on the hotkey input received at step 229) to the virtual assistant host platform 103. For example, the mobile device 102 may send the hotkey input information to the virtual assistant host platform 103 while the first wireless data connection is established.

At step 231, the virtual assistant host platform 103 may receive the hotkey input information sent at step 230. For example, the virtual assistant host platform 103 may receive the hotkey input information via the communication interface 113 and while the first wireless data connection is established.

In some instances, the virtual assistant host platform 103 may identify whether or not it has locally stored information or is otherwise configured to process the hotkey input information without assistance from the event processing system 105. If the virtual assistant host platform 103 is configured to process the hotkey input information using local resources, the virtual assistant host platform 103 may proceed to step 237. If the virtual assistant host platform 103 is not configured to satisfy the intent using local resources, the virtual assistant host platform 103 may proceed to step 232.

Figure 2G:
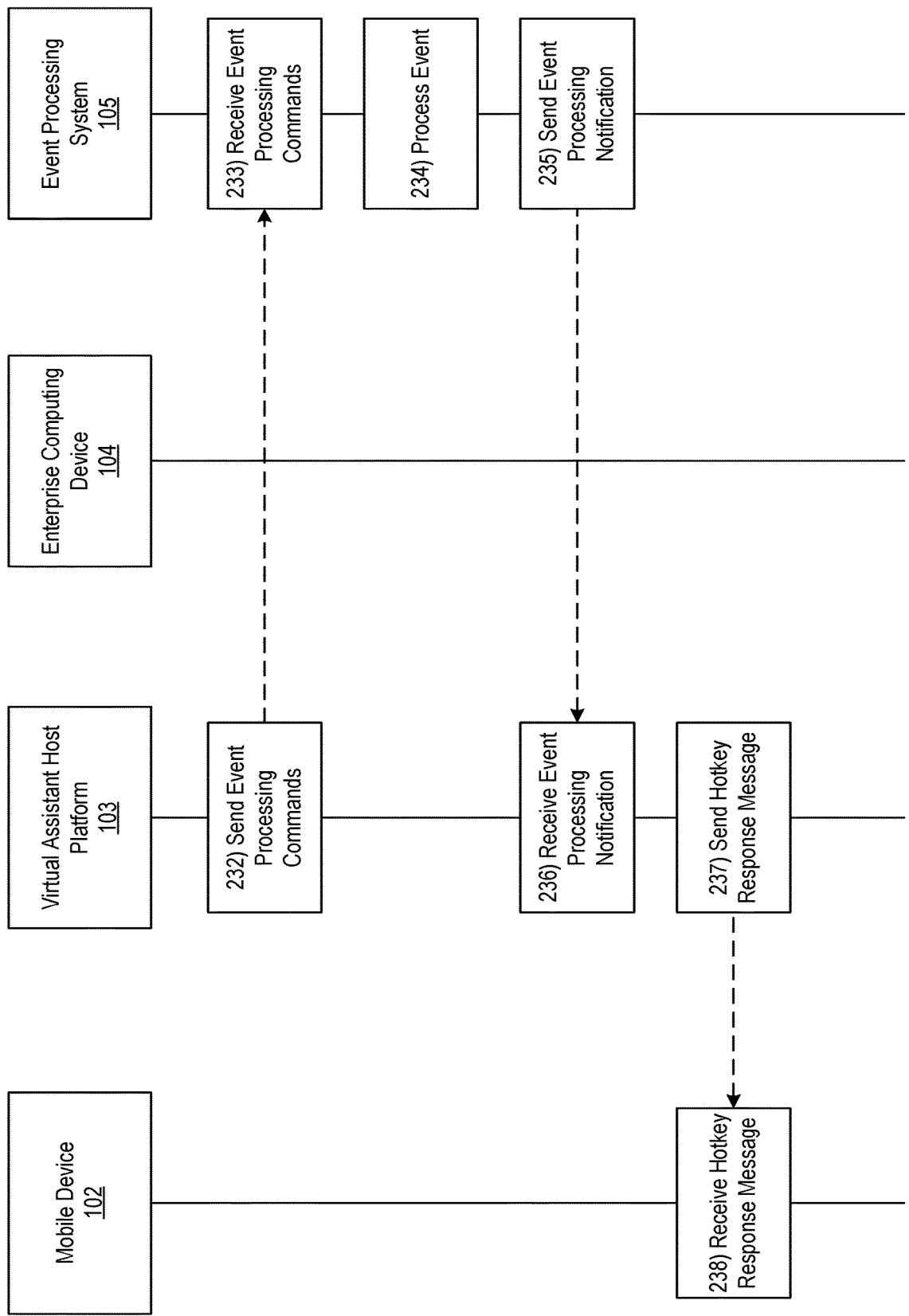

Referring to FIG. 2G, at step 232, the virtual assistant host platform 103 may send one or more event processing commands to the event processing system 105 (e.g., commands to process a request, event, transaction, or the like based on the hotkey input information). For example, the virtual assistant host platform 103 may send the one or more event processing commands to the event processing system 105 via the communication interface 113 and while the second wireless data connection is established. Actions performed at step 232 may be similar to those described above with regard to step 209.

At step 233, the event processing system 105 may receive the one or more event processing commands sent at step 232. For example, the event processing system 105 may receive the one or more event processing commands while the second wireless data connection is established. Actions performed at step 233 may be similar to those described above with regard to step 210.

At step 234, the event processing system 105 may process an event, provide a response to an inquiry, or the like based on or in response to the one or more event processing commands received at step 233. For example, the event processing system 105 may identify an account balance, a transaction status, failed transaction information, credit score information, credit card information, charge/payment information, account information, mortgage information, outage information, or the like. Additionally or alternatively, the event processing system 105 may process or otherwise execute a transaction, fund transfer, or the like. Actions performed at step 234 may be similar to those described above with regard to step 211.

At step 235, the event processing system 105 may generate and send an event processing notification based on the event and/or inquiry processed at step 234. For example, the event processing system 105 may generate a notification indicating an account balance, a transaction status, failed transaction information, credit score information, credit card information, charge/payment information, account information, mortgage information, outage information, or the like. Additionally or alternatively, the event processing system 105 may generate a notification indicating that a transaction, fund transfer, or the like was executed. In some instances, the event processing system 105 may send the event processing notification to the virtual assistant host platform 103 while the second wireless data connection is established. Actions performed at step 235 may be similar to those described above at step 212.

At step 236, the virtual assistant host platform 103 may receive the event processing notification sent at step 235. For example, the virtual assistant host platform 103 may receive the event processing notification via the communication interface 113 and while the second wireless data connection is established. Actions performed at step 236 may be similar to those described above with regard to step 213.

At step 237, the virtual assistant host platform 103 may generate and send a hotkey response message based on the event processing notification received at step 236. For example, the virtual assistant host platform 103 may generate the response message based on the information included in the event processing notification. In some instances, in addition to the response message, the virtual assistant host platform 103 may generate one or more commands directing the mobile device 102 to convert the response message from text to audio, and to output the converted audio response message.

In some instances, the virtual assistant host platform 103 may send the hotkey response message and/or the one or more commands directing the mobile device 102 to convert the hotkey response message from text to audio, and to output the converted hotkey audio response message to the mobile device 102. For example, the virtual assistant host platform 103 may send the hotkey response message and/or the one or more commands directing the mobile device 102 to convert the hotkey response message from text to audio, and to output the converted hotkey audio response message via the communication interface 113 and while the first wireless data connection is established. Actions performed at step 237 may be similar to those described above at steps 214-215.

At step 238, the mobile device 102 may receive the hotkey response message and/or the one or more commands directing the mobile device 102 to convert the hotkey response message from text to audio, and to output the converted hotkey audio response message to the mobile device 102 sent at step 237. For example, the mobile device 102 may receive the hotkey response message and/or the one or more commands directing the mobile device 102 to convert the hotkey response message from text to audio, and to output the converted hotkey audio response message via the communication interface 113 and while the first wireless data connection is established. Actions performed at step 238 may be similar to those described above at step 216.

Referring to FIG. 2H, at step 239, the mobile device 102 may convert the hotkey response message to a hotkey audio response output. For example, the mobile device 102 may use one or more text to speech techniques to convert the hotkey response message (e.g., which may be in text form) to an audio response output. In some instances, the mobile device 102 may convert the hotkey response message to a hotkey audio response output based on or in response to the one or more commands directing the mobile device 102 to convert the hotkey response message from text to audio, and to output the converted hotkey audio response message. Actions performed at step 239 may be similar to those described above with regard to step 217.

At step 240, the mobile device 102 may output the hotkey audio response output generated at step 239. For example, the mobile device 102 may output the hotkey audio response output based on or in response to the one or more commands directing the mobile device 102 to convert the hotkey response message from text to audio, and to output the converted hotkey audio response message. For example, the mobile device 102 may cause an audio output of an account balance, a transaction status, failed transaction information, credit score information, credit card information, charge/payment information, account information, mortgage information, outage information, a transaction status, or the like as a response to the hotkey input information sent at step 230. In some instances, the mobile device 102 may receive feedback corresponding to the hotkey audio response output (e.g., did it satisfy the user intent, or the like), and may send the feedback to the virtual assistant host platform 103, which may update the IVR simulation model accordingly. Actions performed at step 240 may be similar to those described above with regard to step 218.

Figure 3:
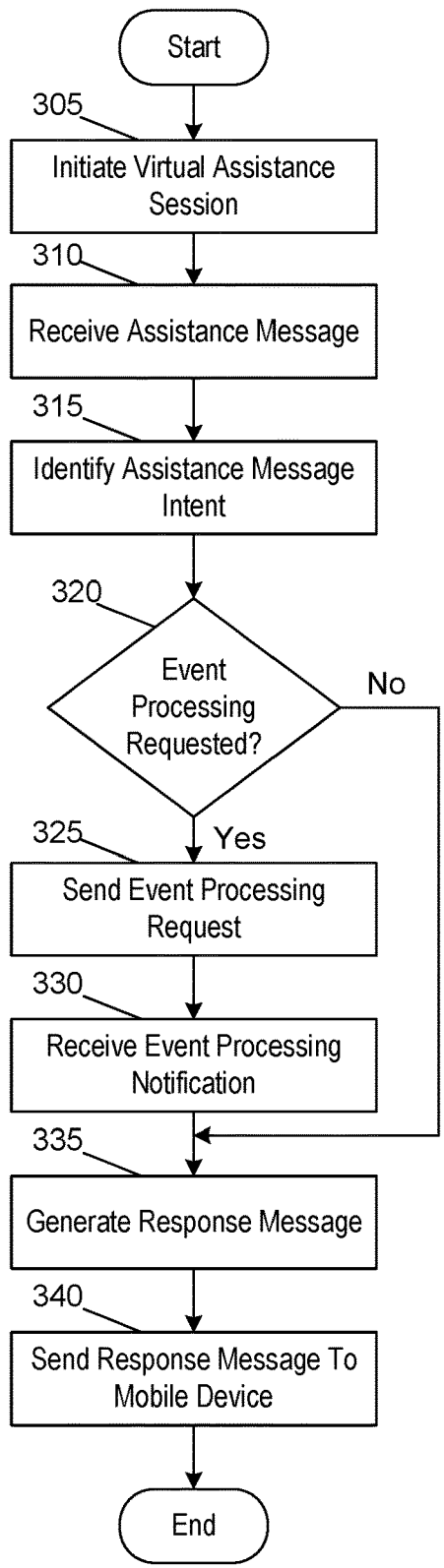
FIGS. 3 and 4 depict illustrative methods for implementing machine learning to enable IVR simulation in accordance with one or more example embodiments.

FIG. 3 depicts an illustrative method for implementing machine learning to enable IVR simulation in accordance with one or more example embodiments. Referring to FIG. 3, at step 305, a computing platform having at least one processor, a communication interface, and memory may initiate a virtual assistance session. At step 310, the computing platform may receive an assistance message from a mobile device requesting virtual assistance. At step 315, the computing platform may identify an intent of the assistance message. At step 320, the computing platform may identify whether event processing is requested. If not, the computing platform may proceed to step 335. If event processing is requested, the computing platform may proceed to step 325.

At step 325, the computing platform may send an event processing request to an event processing system. At step 330, the computing platform may receive an event processing notification indicating a status or other information corresponding to the processed event. At step 335, the computing platform may generate a response message that satisfies the identified intent of the assistance message. At step 340, the computing platform may send the response message to the mobile device.

Figure 4:
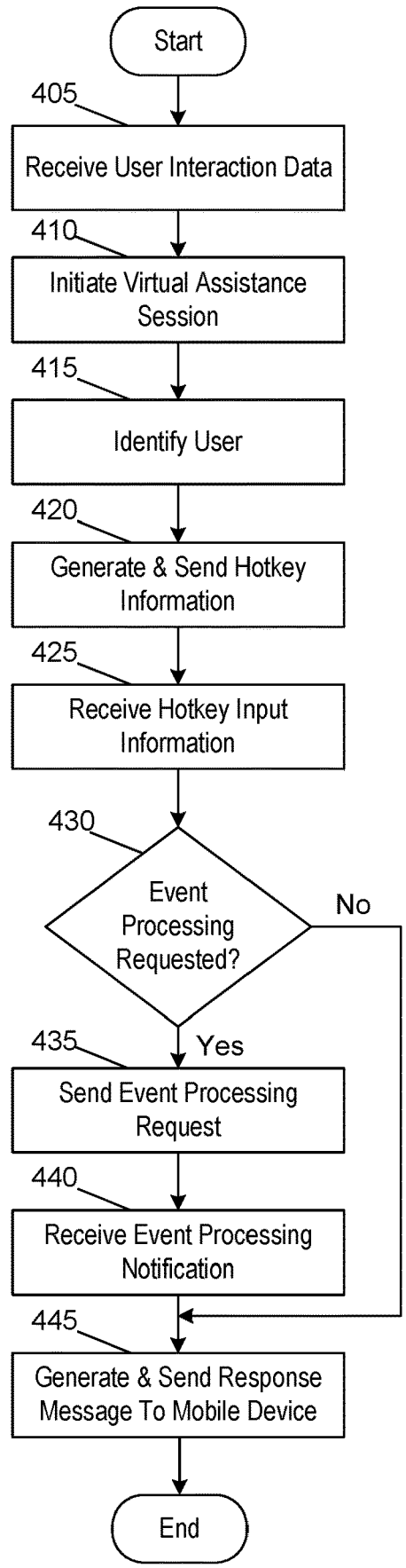

FIG. 4 depicts an illustrative method for implementing machine learning to enable IVR simulation in accordance with one or more example embodiments. Referring to FIG. 4, at step 405, a computing platform having at least one processor, a communication interface, and memory may receive user interaction data corresponding to interactions between a customer and one or more enterprise computing devices. At step 410, the computing platform may initiate a virtual assistance session with a mobile device. At step 415, the computing platform may identify a user corresponding to the mobile device. At step 420, the computing platform may generate and send hotkey information to the mobile device. At step 425, the computing platform may receive hotkey input information from the mobile device. At step 430, the computing platform may identify whether event processing was requested by the mobile device. If event processing was not requested, the computing platform may proceed to step 445. If event processing was requested, the computing platform may proceed to step 435.

At step 435, the computing platform may send an event processing request to an event processing system. At step 440, the computing platform may receive an event processing notification indicating a status and/or other information corresponding to the processed event. At step 445, the computing platform may generate and send a response message to the mobile device indicating a response to the hotkey input information.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
     receive user interaction information corresponding to interactions between a user and one or more enterprise computing devices;
     establish a virtual assistant session with a mobile device;
     identify, based on the user interaction information corresponding to the interactions between the user and the one or more enterprise computing devices, one or more predicted intents for the user;
     generate hotkey information based on the one or more predicted intents for the user;
     send the hotkey information and one or more commands directing the mobile device to output the hotkey information to the mobile device, wherein sending the hotkey information and the one or more commands directing the mobile device to output the hotkey information to the mobile device causes the mobile device to output the hotkey information;
     receive hotkey input information from the mobile device;
     generate, based on the hotkey input information, a hotkey response message; and
     send, to the mobile device, the hotkey response message and one or more commands directing the mobile device to convert the hotkey response message to an audio output and to output the audio output, wherein sending the one or more commands directing the mobile device to convert the hotkey response message to the audio output and to output the audio output causes the mobile device to convert the hotkey response message to the audio output and to output the audio output.

2. The computing platform of claim 1, wherein sending the hotkey information and the one or more commands directing the mobile device to output the hotkey information to the mobile device causes the mobile device to convert the hotkey information to a hotkey audio output and to output the hotkey audio output.

3. The computing platform of claim 2, wherein the hotkey audio output indicates that one or more numeric values displayed on a display of the mobile device correspond to one or more of: a balance inquiry request, a transaction status request, a request for information corresponding to a failed transaction, a credit score inquiry, credit card information, charge/payment information, a request for account information, a mortgage request, a request to execute a transaction, or a request for outage information.

4. The computing platform of claim 1, wherein the one or more enterprise computing devices comprise one or more of: an automated teller machine (ATM) or a computing device at a branch location of a financial institution.

5. The computing platform of claim 1, wherein establishing the virtual assistant session with the mobile device comprises establishing the virtual assistant session with a mobile banking application executing on the mobile device, and wherein establishing the virtual assistant session with the mobile banking application executing on the mobile device comprises authenticating at least one authentication credential associated with an online banking account.

6. The computing platform of claim 5, wherein authenticating the at least one authentication credential associated with the online banking account comprises authenticating one or more of: a user name, a password, biometric information, or a voice input.

7. The computing platform of claim 1, wherein the memory stores additional computer-readable instructions that, when executed by the at least one processor, further cause the computing platform to:
   receive second user interaction information corresponding to interactions between the user and the one or more enterprise computing devices;
   establish a second virtual assistant session with the mobile device;

identify, based on the user interaction information corresponding to the interactions between the user and the one or more enterprise computing devices, one or more second predicted intents for the user; and generate second hotkey information based on the one or more second predicted intents for the user, wherein the second hotkey information is different than the hotkey information.

8. The computing platform of claim 1, wherein the memory stores additional computer-readable instructions that, when executed by the at least one processor, further cause the computing platform to:

receive second user interaction information corresponding to interactions between a second user and one or more second enterprise computing devices;

establish a second virtual assistant session with the mobile device;

identify, based on the second user interaction information corresponding to the interactions between the second user and the one or more second enterprise computing devices, one or more predicted intents for the second user; and generate second hotkey information based on the one or more predicted intents for the second user, wherein the second hotkey information is different than the hotkey information.

9. The computing platform of claim 1, wherein identifying the one or more predicted intents for the user comprises identifying, using a machine learning model, the one or more predicted intents for the user, wherein the machine learning model is trained, prior to identifying the one or more predicted intents, based on a plurality of recorded interactive voice response (IVR) sessions, wherein the plurality of recorded interactive voice response sessions correspond to one or more of: phone sessions or virtual IVR sessions with one or more online banking customers.

10. The computing platform of claim 1, wherein generating the hotkey response message comprises:

sending one or more commands directing an event processing system to process an event based on the hotkey input information, wherein sending the one or more commands directing the event processing system to process the event based on the hotkey input information cause the event processing system to process the event;

receiving, from the event processing system, an event processing notification indicating that the event was processed; and generating, based on the event processing notification indicating that the event was processed, the hotkey response message.

11. A method comprising:

at a computing platform comprising at least one processor, a communication interface, and memory:

receiving user interaction information corresponding to interactions between a user and one or more enterprise computing devices;

establishing a virtual assistant session with a mobile device;

identifying, based on the user interaction information corresponding to the interactions between the user and the one or more enterprise computing devices, one or more predicted intents for the user;

generating hotkey information based on the one or more predicted intents for the user;

sending the hotkey information and one or more commands directing the mobile device to output the hotkey information to the mobile device, wherein sending the hotkey information and the one or more commands directing the mobile device to output the hotkey information to the mobile device causes the mobile device to output the hotkey information;

receiving hotkey input information from the mobile device;

generating, based on the hotkey input information, a hotkey response message; and sending, to the mobile device, the hotkey response message and one or more commands directing the mobile device to convert the hotkey response message to an audio output and to output the audio output, wherein sending the one or more commands directing the mobile device to convert the hotkey response message to the audio output and to output the audio output causes the mobile device to convert the hotkey response message to the audio output and to output the audio output.

12. The method of claim 11, wherein sending the hotkey information and the one or more commands directing the mobile device to output the hotkey information to the mobile device causes the mobile device to convert the hotkey information to a hotkey audio output and to output the hotkey audio output.

13. The method of claim 12, wherein the hotkey audio output indicates that one or more numeric values displayed on a display of the mobile device correspond to one or more of: a balance inquiry request, a transaction status request, a request for information corresponding to a failed transaction, a credit score inquiry, credit card information, charge/payment information, a request for account information, a mortgage request, a request to execute a transaction, or a request for outage information.

14. The method of claim 11, wherein the one or more enterprise computing devices comprise one or more of: an automated teller machine (ATM) or a computing device at a branch location of a financial institution.

15. The method of claim 11, wherein establishing the virtual assistant session with the mobile device comprises establishing the virtual assistant session with a mobile banking application executing on the mobile device, and wherein establishing the virtual assistant session with the mobile banking application executing on the mobile device comprises authenticating at least one authentication credential associated with an online banking account.

16. The method of claim 15, wherein authenticating the at least one authentication credential associated with the online banking account comprises authenticating one or more of: a user name, a password, biometric information, or a voice input.

17. The method of claim 11, further comprising:

receiving second user interaction information corresponding to interactions between the user and the one or more enterprise computing devices;

establishing a second virtual assistant session with the mobile device;

identifying, based on the user interaction information corresponding to the interactions between the user and the one or more enterprise computing devices, one or more second predicted intents for the user; and generating second hotkey information based on the one or more second predicted intents for the user, wherein the second hotkey information is different than the hotkey information.

18. The method of claim 11, further comprising:
receiving second user interaction information corresponding to interactions between a second user and one or more second enterprise computing devices;
establishing a second virtual assistant session with the mobile device;
identifying, based on the second user interaction information corresponding to the interactions between the second user and the one or more second enterprise computing devices, one or more predicted intents for the second user; and
generating second hotkey information based on the one or more predicted intents for the second user, wherein the second hotkey information is different than the hotkey information.

19. The method of claim 11, wherein identifying the one or more predicted intents for the user comprises identifying, using a machine learning model, the one or more predicted intents for the user, wherein the machine learning model is trained, prior to identifying the one or more predicted intents, based on a plurality of recorded interactive voice response (IVR) sessions, wherein the plurality of recorded interactive voice response sessions correspond to one or more of: phone sessions or virtual IVR sessions with one or more online banking customers.

20. One or more non-transitory computer-readable media storing instructions that, when executed by a computing platform comprising at least one processor, a communication interface, and memory, cause the computing platform to:
receive user interaction information corresponding to interactions between a user and one or more enterprise computing devices;
establish a virtual assistant session with a mobile device;
identify, based on the user interaction information corresponding to the interactions between the user and the one or more enterprise computing devices, one or more predicted intents for the user;
generate hotkey information based on the one or more predicted intents for the user;
send the hotkey information and one or more commands directing the mobile device to output the hotkey information to the mobile device, wherein sending the hotkey information and the one or more commands directing the mobile device to output the hotkey information to the mobile device causes the mobile device to output the hotkey information;
receive hotkey input information from the mobile device;
generate, based on the hotkey input information, a hotkey response message; and
send, to the mobile device, the hotkey response message and one or more commands directing the mobile device to convert the hotkey response message to an audio output and to output the audio output, wherein sending the one or more commands directing the mobile device to convert the hotkey response message to the audio output and to output the audio output causes the mobile device to convert the hotkey response message to the audio output and to output the audio output.

* * * * *